United States Patent [19]

Kunz

[11] Patent Number: 4,824,741
[45] Date of Patent: Apr. 25, 1989

[54] SOLID POLYMER ELECTROLYTE FUEL CELL SYSTEM WITH POROUS PLATE EVAPORATIVE COOLING

[75] Inventor: Harold R. Kunz, Vernon, Conn.

[73] Assignee: International Fuel Cells Corporation, South Windsor, Conn.

[21] Appl. No.: 155,184

[22] Filed: Feb. 12, 1988

[51] Int. Cl.[4] ............................................. H01M 8/10
[52] U.S. Cl. ........................................ 429/26; 429/33; 429/34
[58] Field of Search .................. 429/33, 26, 34, 38, 429/39

[56] References Cited

U.S. PATENT DOCUMENTS

| | | | |
|---|---|---|---|
| 3,061,658 | 10/1962 | Blackmer | 429/26 |
| 3,507,702 | 4/1970 | Sanderson | 429/34 X |
| 3,516,867 | 6/1970 | Dankese | 429/26 |
| 3,678,724 | 7/1987 | McElroy | 429/34 |

*Primary Examiner*—Anthony Skapars
*Attorney, Agent, or Firm*—William W. Jones

[57] ABSTRACT

A fuel cell or fuel cell stack of the type utilizing a solid polymer electrolyte membrane is cooled by evaporation of water in the hydrogen reactant chamber of the cells. A porous graphite plate or water permeated membrane is disposed in the hydrogen reactant chamber adjacent to the electrolyte membrane. If a graphite plate is used, it is preferably grooved on the surface facing the electrolyte. The resultant lands preferably contact the supported catalyst layer on the membrane to cool the latter. Water is forced into the pores of the plate or membrane from the edge thereof, and the water vapor is carried out of the cells in the hydrogen reactant exhaust stream. A separate cooling system is thus avoided.

3 Claims, 1 Drawing Sheet

SOLID POLYMER ELECTROLYTE FUEL CELL SYSTEM WITH POROUS PLATE EVAPORATIVE COOLING

TECHNICAL FIELD

This invention relates to a solid polymer electrolyte fuel cell system, and more particularly to the cooling of such a fuel cell system.

BACKGROUND ART

Fuel cell systems using solid polymer membrane electrolytes are known in the prior art. It is desirable in such fuel cells to maintain the electrolyte membrane in a moist condition for most efficient operation of the cells. U. S. Pat. No. 3,061,658 to Blackmer discloses a fuel cell construction which uses a solid polymer electrolyte membrane and which humidifies the oxygen reactant stream to introduce water into the cell to moisten the membrane. This approach can cause problems because the product water formed by the electrolytic reaction appears on the cathode surface of the membrane, as does water which is transferred from the anode side to the cathode side by proton flux. If the cathode side is too moist, a water sheet forming thereon will block access to the cathode by the oxygen reactant. A better approach to solving this problem of membrane dryout is to provide moisture to the anode side of the cell.

DISCLOSURE OF INVENTION

The system of this invention provides a controlled supply of water to the anode surface of the electrolyte membrane, and also uses the water as a coolant for the cells. The cells are cooled by vaporizing water in the anode side, and removing the water vapor from the cells in the hydrogen exhaust streams. The anode side of the cells is provided with a porous graphite plate which has one surface formed with alternating lands and grooves. The contoured side of the plate faces the electrolyte membrane with the lands touching the anode surface of the membrane and the grooves forming a hydrogen flow field for the hydrogen reactant. The basal portion of the plate away from the membrane is continuous and forms a matrix into which water is pumped. The water entrained in the plate diffuses into the lands so that the plate provides a plurality of moist contacts with the membrane whereby moisture is added to the membrane. Water can also vaporize off of the surface of the plate to cool the cell. In order to counter excessive cooling at the hydrogen gas inlet side of the cell, the area of the membrane exposed to the incoming dry hydrogen gas may be restricted. The moist plate may be made from uncatalyzed PTFE-bonded electrode material, a suitable porous sintered powder, porous fibers, or even a porous polymer film.

It is therefore an object of this invention to provide a solid polymer electrolyte fuel cell system which maintains the electrolyte membrane in a suitably moist condition.

It is a further object of this invention to provide a fuel cell system of the character described wherein the cells are cooled by evaporating water from the anode side of the cells.

It is an additional object of this invention to provide a fuel cell system of the character described wherein prevention of membrane dry-out, and cell cooling are both provided by a common source of water in the cells.

These and other objects and advantages will become more readily apparent from the following detailed description of a preferred embodiment of the invention when taken in conjunction with the accompanying drawings.

BEST MODE FOR CARRYING OUT THE INVENTION

Figure 1:
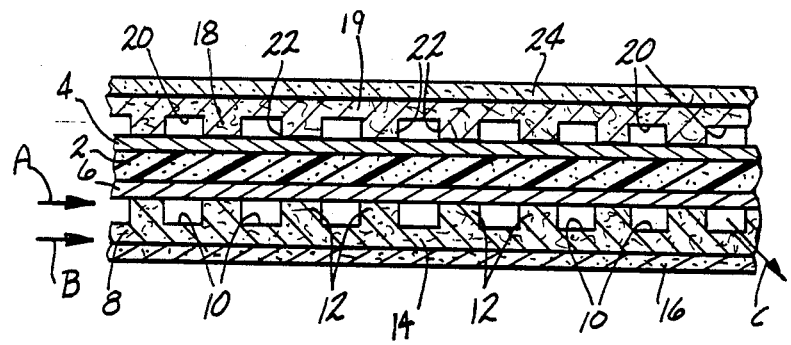
FIG. 1 is a fragmented side sectional view of a cell structure formed in accordance with this invention.

Referring now to the drawings, there is shown in FIG. 1 a preferred embodiment of a solid polymer electrolyte fuel cell assembly formed in accordance with this invention. The electrolyte membrane 2 has a cathode catalyst 4 disposed on one surface, and an anode catalyst 6 disposed on the opposite surface. A porous plate 8 is positioned adjacent to the anode catalyst 6, the plate 8 having a contoured face with grooves 10 and lands 12 formed thereon. The lands 12 contact the anode catalyst layer 6, and the grooves 10 form a hydrogen flow field through which the hydrogen reactant flows. The basal part 14 of the plate 8 is porous and contains water which is pumped thereinto from the edge of the cell. The basal part 14 of the plate 8 thus acts as an aquifer for the surface of the plate 8 facing the electrolyte membrane 2. The hydrogen stream enters the flow field in the direction of the arrow A and the water is pumped into the plate 8 in the direction of the arrow B. The hydrogen reactant will be at a pressure somewhat above 20 psia, the water vapor pressure at cell operating temperatures of about 228° F. The hydrogen exhaust with entrained water vapor exits the cell in the direction of the arrow C. An impervious carbon, or the like, separator plate 16 seals the cell against water and gas crossover to the next adjacent cell (not shown). Adjacent to the cathode catalyst layer 4 is a cathode plate 18 similar to the anode plate 8, the plate 18 having a basal part 19 and having a contoured face with grooves 20 and lands 22 facing the cathode catalyst layer 4. The cathode plate 18 can absorb water which appears on the cathode side of the cell so as to keep the cathode free of water and open to the oxygen reactant supply. Preferably, a sheet of partially wetproofed carbon paper (not shown) will be interposed between the catalyst layer 4 and the lands 22. The water which appears at the cathode will pass through the paper sheet to the lands 22, and the oxygen will diffuse from the lands 22 to the basal part 19 of the plate 18. An impervious carbon, or the like, separator plate 24 is disposed adjacent to the cathode plate 18 to isolate the cell from the next adjacent cell in the stack.

Figure 2:
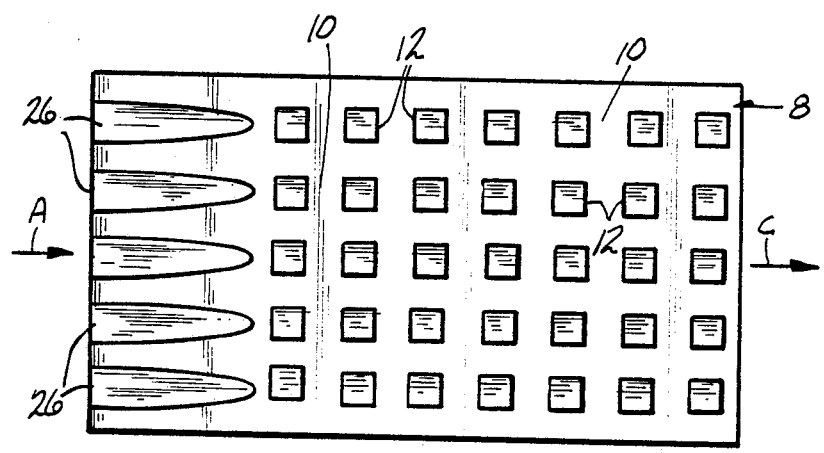
FIG. 2 is a plan view of the contoured face of the water reservoir plate.

Referring to FIG. 2, the contoured side of the anode plate 8 is shown. It will be noted that the grooves 10 and lands 12 provide a waffle iron appearance to the plate 8. The arrows A and B show the direction of flow of the hydrogen reactant through the hydrogen flow field. It will be noted that the hydrogen gas entering the flow field as denoted by the arrow A, is quite dry, thus the portion of the electrolyte membrane over which this initially very dry gas first flows will have the greater risk of being excessively cooled. As the hydrogen flows through the cell, it picks up moisture from the plate 8 so that subsequent portions of the membrane are not prone to excessive cooling. In order to protect the edge of the membrane against excessive cooling, tapered membrane shrouds 26 can be disposed at the hydrogen inlet side of the cell. The shrouds 26 can be formed as integral bosses on the plate 8 or can be in the form of separate shims which are positioned in the hydrogen flow field as shown. The shrouds 26 cover and protect parts of the plate 8 against excessive water evaporation into incoming hydrogen gas and cover and protect parts of the membrane 2 against drying.

It will be appreciated that the fuel cell system of this invention avoids the problem of membrane dry out by using the water saturated anode flow field plates, and also uses the same plates to cool the cells in the stack. The water which is used to saturate the plates can be supplied to the cell by maintaining a pressure differential between the water and the hydrogen gas in the cell whereas the water pressure is higher than the gas pressure. This could be accomplished by a pump for the water. Water vapor leaving the cell in the hydrogen gas stream can be condensed, and the liquid water separated. It can then be pumped in a storage tank for subsequent recirculation to the cell.

Since many changes and variations of the disclosed embodiment of the invention may be made without departing from the inventive concept, it is not intended to limit the invention otherwise than as required by the appended claims.

I claim:

1. A solid polymer electrolyte fuel cell system comprising:
   (a) a solid polymer electrolyte membrane having anode and cathode catalyst layers on opposite sides thereof;
   (b) a porous anode flow field plate adjacent to the anode catalyst layer, said anode flow field plate including a continuous basal part and a contoured face fronting said anode catalyst layer, said contoured face including a plurality of lands abutting said anode catalyst layer with intervening grooves defining a flow field for gaseous anode reactant; and
   (c) means for pumping water into said basal part of said anode flow field plate at a pressure near anode reactant gas pressure whereby water will migrate from said flow field plate basal part to said lands in continuous fashion to be absorbed into said electrolyte membrane, and whereby said anode flow field plate will provide a moist surface from which water will evaporate to cool the fuel cell.

2. The fuel cell system of claim 1, further comprising an impervious separator plate between said anode flow field plate and an adjacent fuel cell to prevent water from passing from said anode flow field plate to the adjacent fuel cell.

3. The fuel cell system of claim 1 further comprising a plurality of membrane shrouds overlying major portions of the membrane on the side thereof contacting the gaseous anode reactant, said shrouds being positioned on a reactant inlet side of said flow field to protect said membrane from exposure to dry incoming reactant gases whereby localized drying out of the membrane will be retarded.

* * * * *